US010282566B2

(12) United States Patent
Moore (10) Patent No.: US 10,282,566 B2
(45) Date of Patent: May 7, 2019

(54) COMPUTING DEVICE SECURITY LOCK (71) Applicant: HEWLETT-PACKARD DEVELOPMENT COMPANY, L.P., Houston, TX (US)

(72) Inventor: Earl W Moore, Houston, TX (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 16 days.

(21) Appl. No.: 15/030,261

(22) PCT Filed: Nov. 25, 2013

(86) PCT No.: PCT/US2013/071723
§ 371 (c)(1),
(2) Date: Apr. 18, 2016

(87) PCT Pub. No.: WO2015/076848
PCT Pub. Date: May 28, 2015

(65) Prior Publication Data
US 2016/0292463 A1 Oct. 6, 2016

(51) Int. Cl.
G06F 21/88 (2013.01)
E05B 73/00 (2006.01)
(Continued)

(52) U.S. Cl.
CPC .......... G06F 21/88 (2013.01); E05B 17/2023 (2013.01); E05B 65/0067 (2013.01);
(Continued)

(58) Field of Classification Search
CPC ...... G06F 1/1626; G06F 1/1632; G06F 21/88; E05C 19/163; E05B 73/0082; E05B 65/0067; E05B 17/2023; E05B 73/0005
(Continued)

(56) References Cited

U.S. PATENT DOCUMENTS 5,531,082 A 7/1996 Wolk et al.
5,787,738 A 8/1998 Brandt et al.
(Continued)

FOREIGN PATENT DOCUMENTS

CN 1763690 4/2006
CN 101685327 3/2010
(Continued)

OTHER PUBLICATIONS

Hollister; "Lenovo Thinkpad Helix Tablet / Laptop Hybrid Gets a Power-up When it Docks", <http://www.theverge.com/2013/1/6/3844010/lenovo-thinkpad-helix-convertible, Jan. 6, 2013: 5 pages.
(Continued)

Primary Examiner — Jeffrey C Pwu
Assistant Examiner — Nega Woldemariam
(74) Attorney, Agent, or Firm — HPI Patent Department (57) ABSTRACT A base member for a tablet computing device including a fastener to removably couple a tablet computing device to the base. A receptacle can receive a security lock to secure the base, wherein the security lock is to prevent the fastener from releasing the tablet computing device in a first mode and allows the releasing of the tablet computing device in a second mode.

8 Claims, 8 Drawing Sheets (51) Int. Cl.
*G06F 1/16* (2006.01)
*E05B 15/12* (2006.01)
*E05B 65/00* (2006.01)
*E05C 19/16* (2006.01)
*E05B 15/10* (2006.01)

(52) U.S. Cl.
CPC ........ *E05B 73/0082* (2013.01); *G06F 1/1626* (2013.01); *G06F 1/1632* (2013.01); *E05B 15/101* (2013.01); *E05B 73/0005* (2013.01); *E05C 19/163* (2013.01)

(58) Field of Classification Search
USPC ........................................ 455/41.2; 206/45.23
See application file for complete search history.

(56) References Cited

U.S. PATENT DOCUMENTS

| | | |
|---|---|---|
| 7,415,852 B1 | 8/2008 | Merrem |
| 2005/0028571 A1 | 2/2005 | Merrem et al. |
| 2005/0248914 A1 | 11/2005 | Allen |
| 2012/0125057 A1 | 5/2012 | Mahaffey et al. |
| 2012/0201000 A1* | 8/2012 | Allen .................. E05B 73/0082 361/679.57 |
| 2012/0211377 A1* | 8/2012 | Sajid ..................... G06F 1/1628 206/216 |
| 2013/0083466 A1 | 4/2013 | Becze et al. |
| 2013/0186682 A1 | 7/2013 | Gallagher et al. |
| 2013/0259564 A1* | 10/2013 | Lin ....................... H01R 13/42 403/327 |

FOREIGN PATENT DOCUMENTS

| | | |
|---|---|---|
| CN | 102654787 | 9/2012 |
| TW | M400005 U | 3/2011 |

OTHER PUBLICATIONS http://web/archive.org/web/20130202092333/http://gadget.sin.com/kensington-secureback (Kensington Secureback iPad 2 case); Feb. 2, 2013.

* cited by examiner

COMPUTING DEVICE SECURITY LOCK

BACKGROUND

A tablet computer is a mobile computer with a display, circuitry and battery in a single unit without a physical keyboard. Tablets are equipped with sensors, including cameras, microphone, accelerometer and touchscreen, with finger or stylus gestures replacing a computer mouse and keyboard. A tablet may be attached to a physical keyboard accessory.

BRIEF DESCRIPTION OF THE DRAWINGS

Some examples of the invention are described with respect to the following figures.

DETAILED DESCRIPTION

A laptop computer often includes security receptacle to attach a security cable. A tablet computing device may a security receptacle and a base member. The security receptacle may attach to a security cable. In some examples, the base member may include the security receptacle. If the tablet computing device is coupled to the base member a user would have to use two cables to secure both the tablet computing device and the base member.

In an embodiment, who a security cable is attached to either the base member or the tablet computing device and the tablet computing device is coupled to the base member the tablet computing device and the base member cannot be separated until the security cable is removed. Therefore, a second security cable is not used to secure both the base member and the tablet computing, device.

In an embodiment, a computing device includes a base member and a tablet computing device. A fastener can removably couple the base member and the tablet computing device. A receptacle can receive a security lock. The security lock can prevent the fastener from releasing the tablet computing device from the base member.

In an embodiment, a base member for a tablet computing device may include a fastener to removably couple a tablet computing device to the base member. A receptacle can receive a security lock to secure the base member. The security lock may prevent the fastener from releasing the tablet computing device in a first mode and allow the releasing of the tablet computing device in a second mode.

In an embodiment, a base member for a tablet computing device can include a receptacle to receive a security lock. A tablet computing device locking mechanism can rotate in a first direction to prevent the tablet computing device from being removed. The tablet computing device locking mechanism may also rotate in a second direction to allow the tablet computing device to be removed while the security lock is attached to the receptacle.

Figure 1:
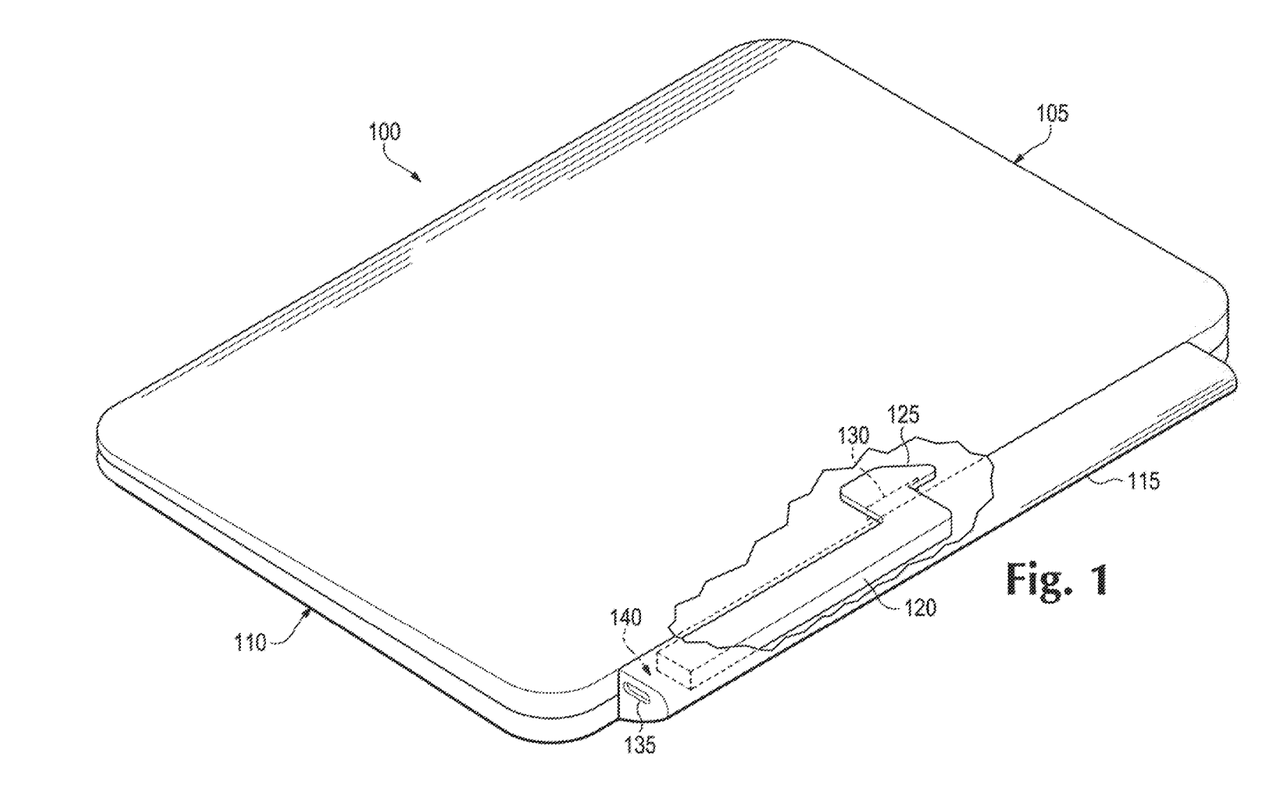
FIG. 1 is a perspective view according to an example implementation.

With reference to the figures, FIG. 1 is a perspective view according to an example implementation. A base member 110 for a tablet computing device 105 may include, for example, a keyboard to add an additional input device to the tablet computing device 105. The tablet computing device 105 can include a display. The tablet computing device 105 may be attached to the base member 110 so that the display is not visible when the surface of the tablet computing device 105 is the display is adjacent to the base member 110. In this state the tablet computing device 105 and the base member 110 may resemble a closed notebook computer. The tablet computing device 105 may also be attached to the base member 110 such that a surface opposite the display is adjacent to the base member 110 allowing the display to be visible.

A fastener 125 can removably couple a tablet computing device 105 to the base member 110. The fastener 125 may be, for example, a hook that is received by an opening 130 when aligned with the opening 130. The fastener 125 may also become offset after passing through the opening 130 to prevent the fastener 125 from passing back through the opening 130 until the fastener 125 and the opening 130 are aligned again. The edges surrounding the opening 130 may provide a shoulder to rest the fastener 125 on when the tablet computing device 105 and the base member 110 are coupled.

A receptacle 135 can receive a security lock to secure base member 110. The security lock may, for example, be connected to a security cable to anchor the security lock and therefore anchor the base member 110. The receptacle 135 can include a slot and a volume 140 behind a slot in the tablet computing device 105.

When the security lock is inserted into the receptacle 135, a portion of the security lock is in volume 140. To release the fastener 125 from the opening 130, the shaft 120 connected to the fastener 125 has to slide into the volume 140. If the shaft 120 is prevented from sliding into the volume 140 far enough so that the fastener 125 aligns with the opening 130, then the fastener 125 cannot pass through the opening 130. For example in a first mode, the security lock is attached to the receptacle 135 to prevent the fastener 125 from releasing the tablet computing device 105. In a second mode, the security lock is not attached to the receptacle to allow the tablet computing device 105 to be separated from the base member 110.

Figure 2A:
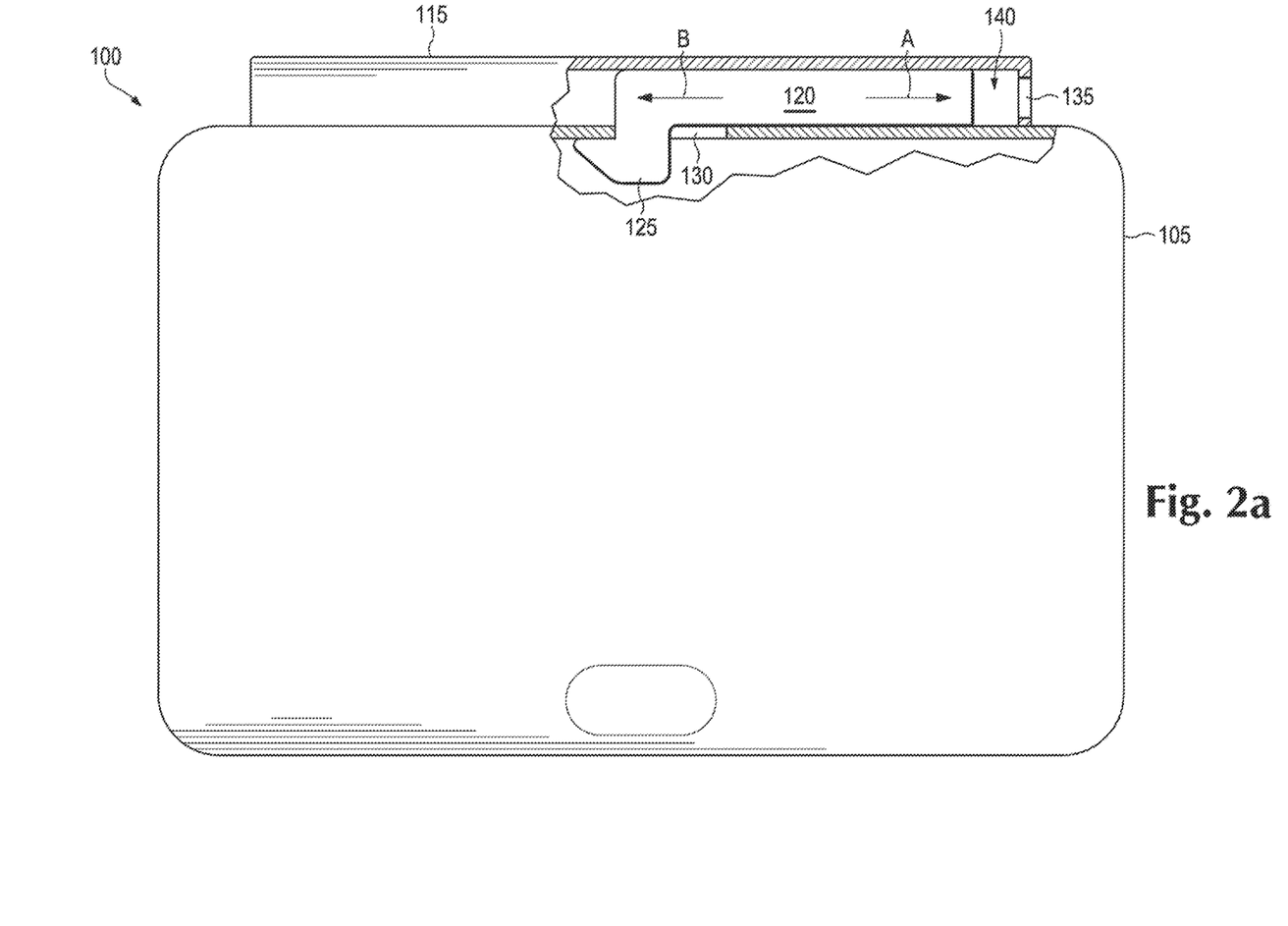
FIGS. 2a-2c are a top views according to an example implementation.
Figure 2B:
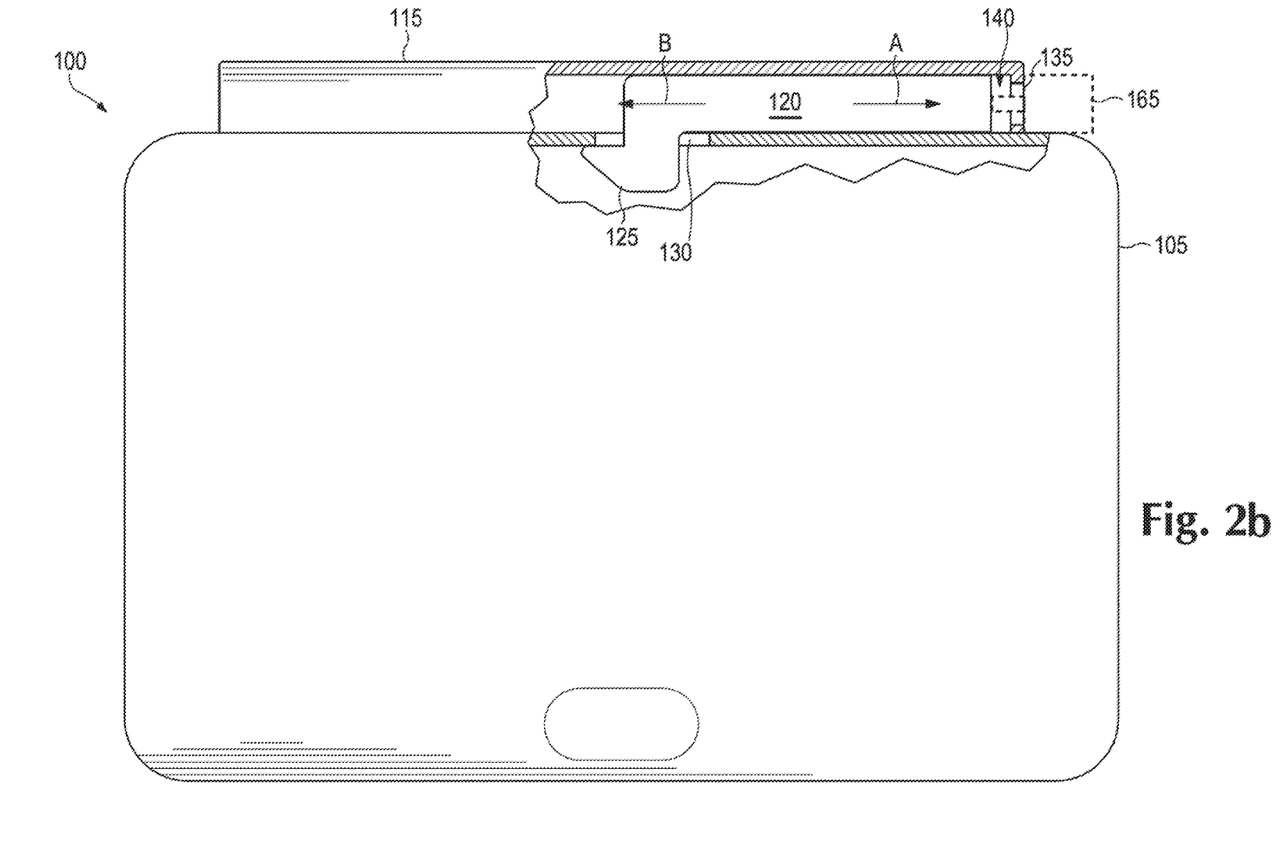
Figure 2C:
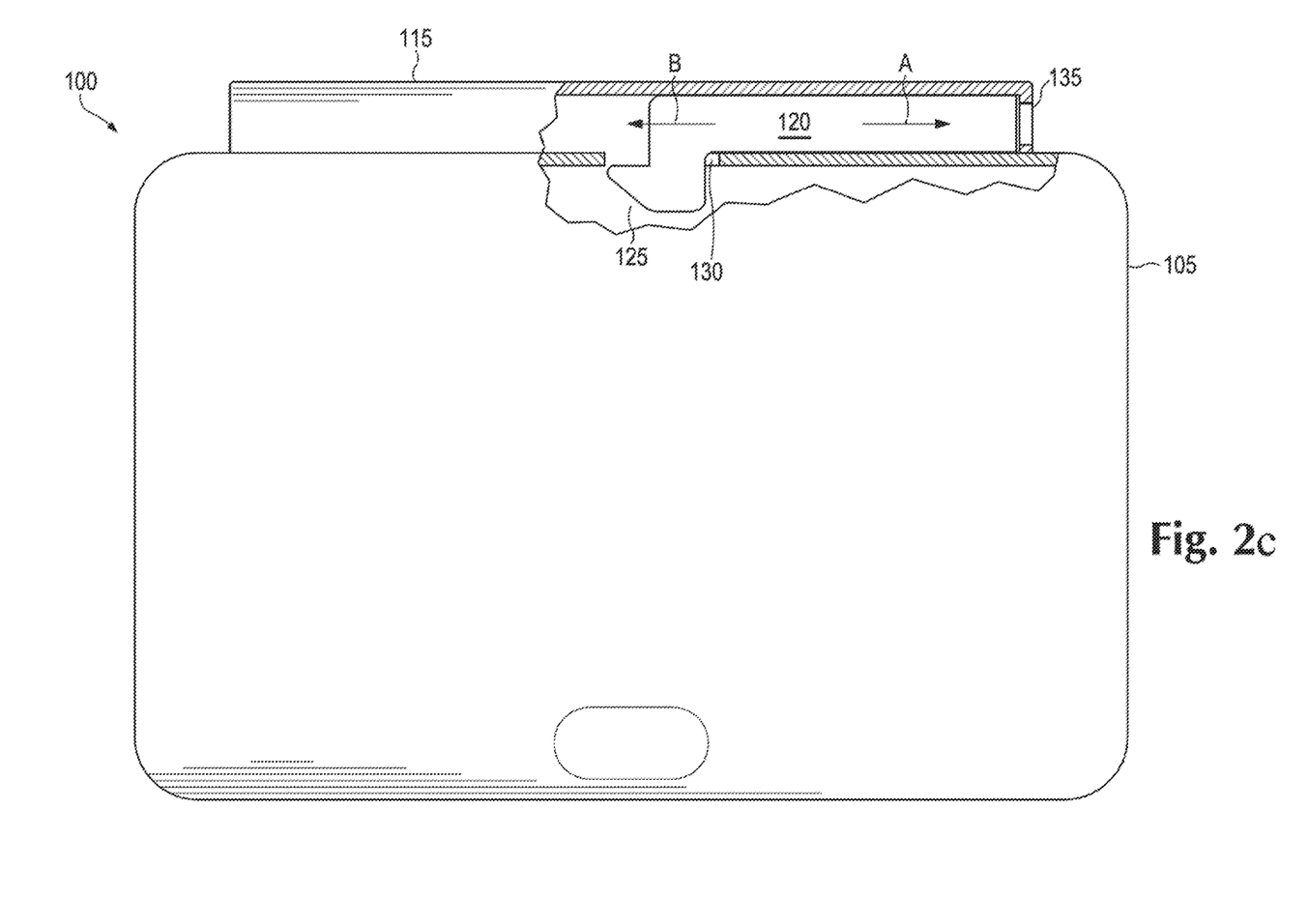

FIGS. 2a-c are top views according to an example implementation. FIG. 2a is a top view when the fastener is preventing the tablet computing device 105 from separating from the base member 115. The base member 115 may include a first portion 110 and a second portion 115 coupled by a hinge. The base member 115 may include for example an input device sixth as a keyboard or touchpad, battery, storage device such as a hard disk drive or solid state storage. A tablet computing device 105 can be removably attached to the base member 110.

A fastener 125 can removably couple the base member 115 and the tablet computing device 105. The fastener 125 can be received by an opening 130. The fastener 125 may be connected to a shaft 120. The shaft 120 may move laterally, from side to side, in the A or B direction. The lateral movement of the shaft may be along the back of the tablet computing device 105 of the base member 110 or 115. While the movement of the shaft 120 is shown as lateral movement in the A or B direction, other movements contemplated that would be prevented by a security lock being inserted in the receptacle 135.

In FIG. 2b, a receptacle 135 can receive a security lock 165. When the security lock 165 is inserted into the receptacle 135, the security lock occupies at least a portion of the volume 140. As shown, the fastener 125 is not aligned with opening 130 because a portion of the security look 165 is in the volume 140.

When the security lock occupies at least a portion of volume 140. the shaft 120 is prevented from sliding into the volume 140 to release the fastener 125 from the opening 130. The shaft 120 may be in a base member 115. The security lock can prevent the fastener 125 from aligning with the opening so that the fastener cannot pass through the opening 130 to prevent the fastener 125 from releasing the tablet computing device 105 from the base member 110. Although the fastener 125 is shown as part of the base member 115 passing through an opening in the tablet computing device 105, the tablet computing device 105 and base member 115 can be interchanged.

In FIG. 2c the security lock 165 is removed and to release the tablet computing device 105 from the base member 115 the shaft 120 has to slide in direction A to align the fastener 125 with the opening 130 which can be done without the security lock 165 preventing the shaft from sliding in to the volume 140. The fastener 125 can be biased in the direction B. The bias may be created by a spring, a magnetic field or another type of bias. When the tablet computing device is attached to the base member 115 the tablet computing device 105 may force the fastener in the A direction until the fastener 125 passes through the opening 130 when it is biased in the direction B to attach the tablet computing device 105 to the base member 115. In an alternative implementation the shaft 120 is biased in direction A and when the tablet computing device is attached causing the fastener 125 to pass through the opening 130 magnets attract the fastener 125 in direction B.

The security lock that is attached to the receptacle may be attached to a security cable. The security cable may be anchored to a desk or pole for example to prevent someone from removing the computer from the area around the anchor without the security lock being removed from the receptacle.

The receptacle 135 may include a slot in the base member 110, the tablet computing device 105 or the base member 115. The slot may be longer than it is wide such as a rectangle and the rectangle may have rounded corners, may be round, oval or another shape. The portion of the security lock inserted through the receptacle may be longer than it is wide and may be inserted in the slot and rotated clockwise or counter clockwise about 90 degrees so that the security lock cannot fit through the receptacle 135 when the security lock is rotated.

Figures 3A, 3B, 3C:
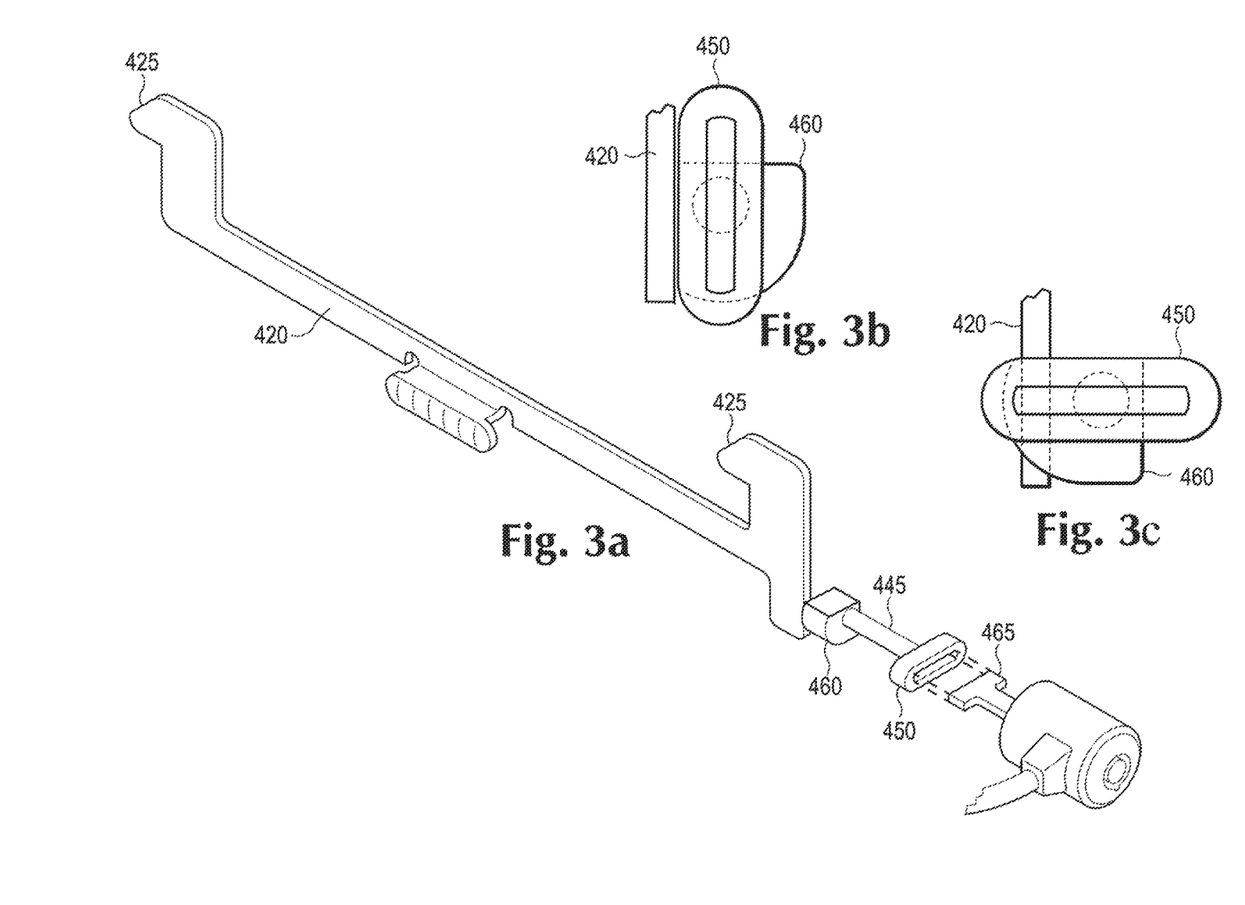
FIG. 3a is a view of a lock when according to an example implementation.
FIGS. 3b-3c are an end of the mechanism FIG. 3a according to an example implementation.

FIG. 3a is a view of a lock mechanism according to an example implementation. The lock mechanism can be in a base member for a tablet computing device. The lock mechanism can include a receptacle to receive a security lock 465. The security lock 465 can pass through a slot in the base member and into receiver 450. The receiver 450 is attached to a slide stop 460. The receiver 450 may be attached to the receive 450 by a rod 445. The tablet computing device locking mechanism including the receiver and slide stop 460 can rotate a first direction to prevent the tablet computing device from being removed and rotates a second direction to allow the tablet computing device to be removed while the security lock is attached to the receptacle. In FIG. 3a the slide stop 460 is rotated such that the shaft cannot slide past the slide stop 460 preventing the fasteners 425 from releasing the tablet computing device from the base member.

FIGS. 3b-3c are an end view of the lock mechanism of FIG. 3a according to an example implementation. FIG. 3b shows an example of a first position of the receiver prior to inserting the security lock 465 into the receiver 450 and rotating the receiver 450 and the slide stop 460. FIG. 3c shows an example of a second position of the receiver after inserting the security lock 465 into the receiver 450 and rotating the receiver 450 about 90 degrees clockwise. Once the security lock is rotated in the receptacle about 90 degrees the security lock can be locked to prevent the security lock from further rotating and allowing the removal of the security lock and the rotation of the receiver 450.

Figures 4A, 4B, 4C, 4D:
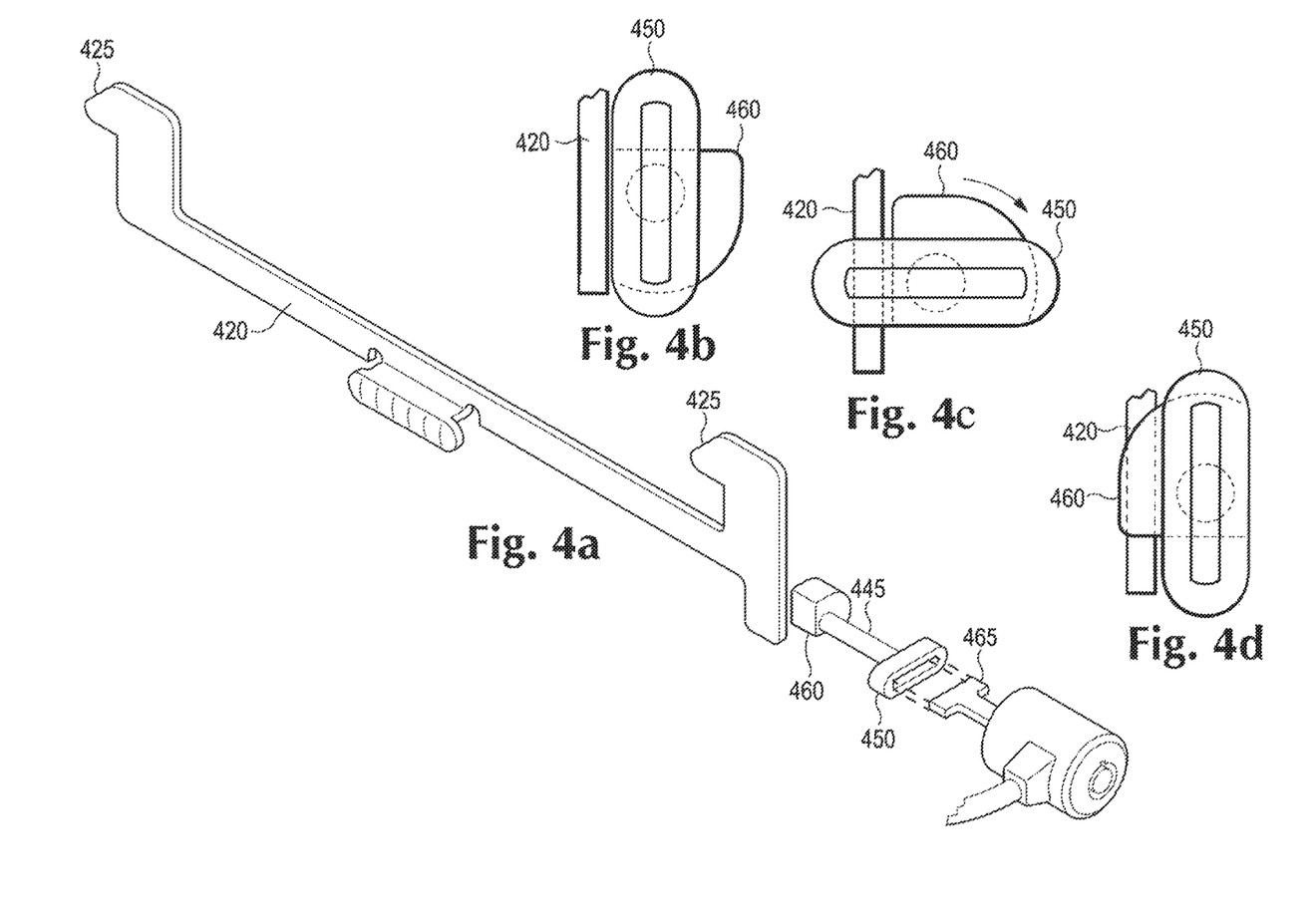
FIG. 4a is a view of a lock mechanism according to an example implementation.
FIGS. 4b-4d are an end view of the lock mechanism of FIG. 3a according to an example implementation.

FIG. 4a is a view of a lock mechanism according to an example implementation. The lock mechanism can be in a base member for a tablet computing device. The lock mechanism can include a receptacle to receive a security lock 465. The security lock 465 can pass through a slot in the base member and into receiver 450. The receiver 450 is attached to a slide stop 460. The receiver 450 may be attached to the receiver 450 by a rod 445. The tablet computing device locking mechanism including the receiver and slide stop 460 can rotate a first direction to prevent the tablet computing device from being removed and rotates a second direction to allow the tablet computing device to be removed while the security lock is attached to the receptacle. In FIG. 4a the slide stop 460 is rotated such that the shaft can slide past the slide stop 460 causing the fasteners 425 to release the tablet computing device from the base member.

FIG. 4b is an end view of the lock mechanism of FIG. 4a according to an example implementation. FIG. 4b shows an example of a first position of the receiver prior to inserting the security lock 465 into the receiver 450 and rotating the receiver 450 and the slide stop 460. FIG. 4c shows an example of a third position of the receiver after inserting the security lock 465 into the receiver 450 and rotating the receiver 450 about 90 degrees counter clockwise. Although the second position is described as being rotated about 90 degrees clockwise and the third position is described as being rotated about 90 degrees counter clockwise the clockwise and counter clockwise rotation may be reversed in some implementations. Once the security lock is rotated in the receptacle about 90 degrees the security lock can be locked to prevent the security lock from further rotating. In the third position depicted in FIG. 4c the security lock can secure the base member or the tablet computing device while allowing the shaft 420 to slide past the slide stop 460 allowing the separation of the tablet computing device from the base member.

In a fourth position depicted in FIG. 4d, the security lock 465 may be rotated in such a way that the slide stop 460 continues to prevent the sliding of the shaft 420 after the security lock 465 is removed from the receptacle. For example, the security lock 465 may be rotated about 180 degrees from the first position where the slide stop 460 prevents the shaft 420 from sliding past the slide stop 460 while allowing the security lock 465 to be removed from a receptacle.

Figure 5:
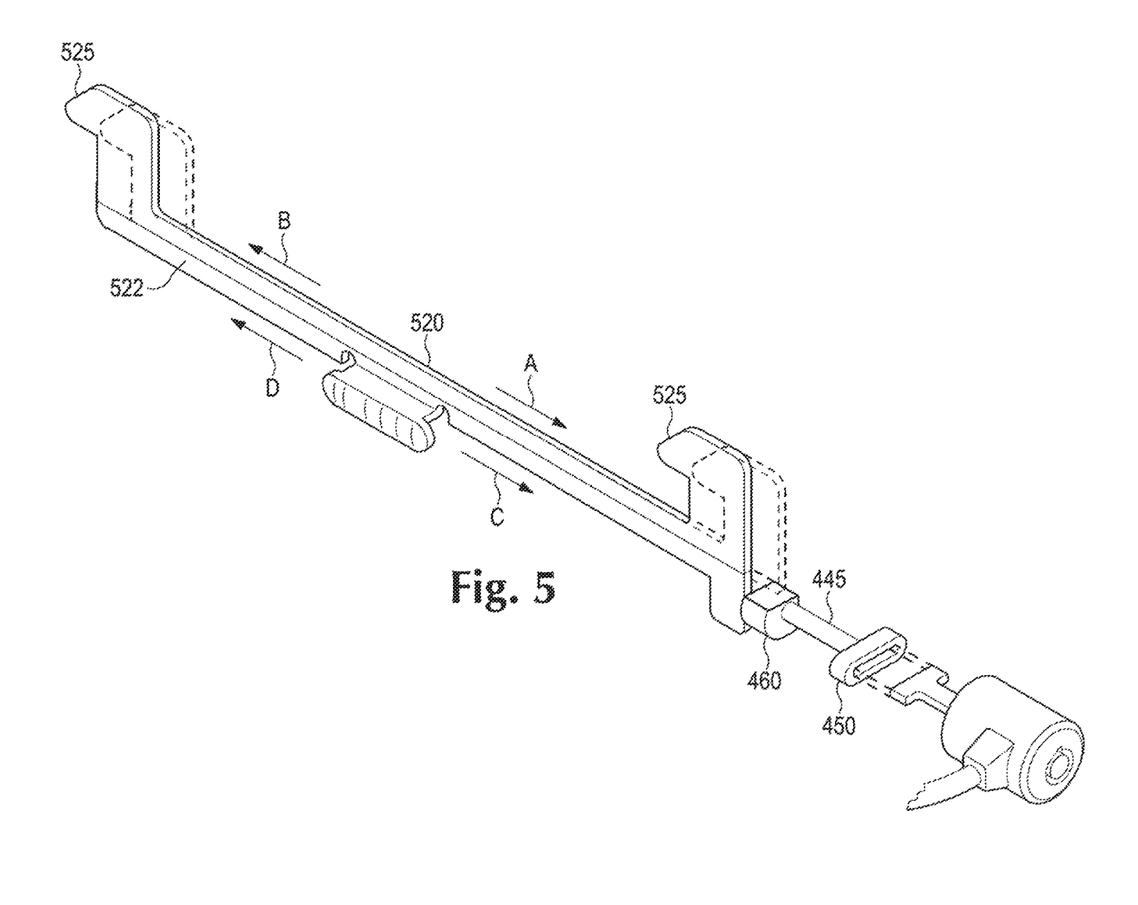
FIG. 5 is a view of a lock mechanism according to an example implementation.

FIG. 5 is a view of a lock mechanism according to an example implementation. In some implementations a user may want the fastener to allow the tablet computing device to be connected to the base member if the security lock is preventing a shaft 522 from sliding. For example the shaft 522 when slid in direction C by a user the shaft 520 is also then also slid in direction A. However, when shaft 520 is slid in direction A by attachment of the tablet computing device to the base member then the shaft 522 does not move in direction C shown by the dotted lines. The shaft 520 can be biased in direction B so that when the tablet computing device is attached to the base member the shaft 520 causes the fasteners 525 to move in direction B and secure the tablet computing device to the base member. The shaft 522 may also be biased in direction D. For example when the tablet computing device is attached to the base member the fasteners 525 can slide to attach the tablet computing device to the base member independent of the shaft 522 so that even if the base member is locked by a security lock the tablet computing device can be attached to the base member. To separate the tablet computing device from the base member the shaft 522 would have to be slid in direction C by a use. For example when applying the locking mechanism of FIGS. 3-4 to the shaft 522, the tablet computing device can be attached to the base member when the security lock is attached and the locking mechanism is rotated to the first direction.

In an alternative embodiment the fasteners 525 and the shaft 520 are biased in direction A and when the tablet computing device is attached then the tablet computing device pulls the fasteners in direction B. While the tablet computing device is pulling the fasteners in direction B such as by a magnetic field attracting the fasteners the fasteners do not move in direction A until a force is applied to shaft 522 in direction C.

Figure 6:
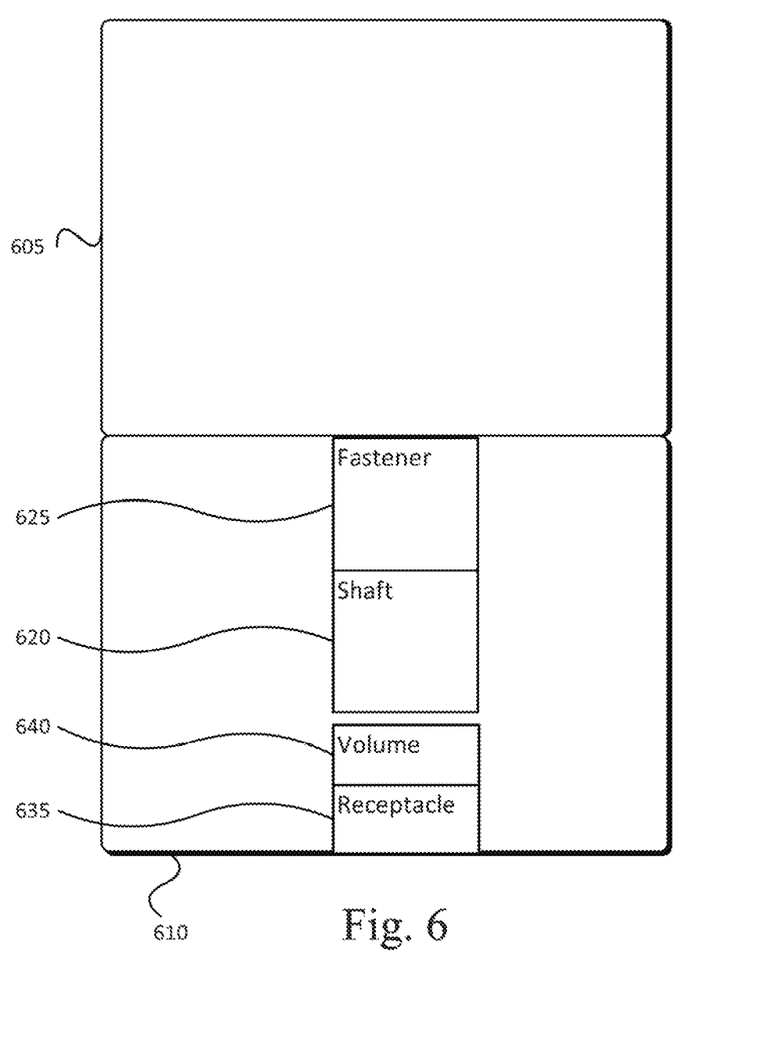
FIG. 6 is a block diagram system according to an example implementation.

FIG. 6 is a block diagram of system according to an example implementation. A base member 610 for a tablet computing device 605 may include for example a keyboard to add an additional input device to the tablet computing device 605. A fastener 625 can removably couple a tablet computing device 605 computing device to the base member 610. The fastener 625 may be for example a hook that is received by an opening when aligned with the opening but becomes offset after passing through the opening to prevent the fastener from passing back through the opening until the fastener and the opening are aligned again.

A receptacle 635 can receive a security lock to secure the base member. The security lock may for example be connected to a security cable to anchor the unity lock and therefore anchor the base member. The receptacle 635 can also include a volume 640.

When the security lock is inserted into the receptacle 635 a portion of the security lock is in volume 640. To release the fastener 625 the shaft 620 connected to the fastener 625 has to slide into the volume 640. If the shaft 120 is prevented from sliding into the volume 640 far enough so that the fastener is released then the tablet computing device 605 may not be released from the base member 610. For example, in a first mode the security lock is attached to the receptacle 635 to prevent the fastener 625 from releasing the tablet computing device 605 and in a second mode the security lock is not attached to the receptacle to allow the tablet computing device to be separated from the base member.

It is to be understood that the phraseology and terminology used herein is for the purpose of description and should not be regarded as limiting. The use of "comprising", "including" or "having" are synonymous and variations thereof herein is meant to encompass the items listed thereafter and equivalents thereof as well as additional items. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   a base member comprising a keyboard;
   a tablet computing device to communicatively couple to the keyboard of the base member;
   a fastener enclosed within the base member to removably couple the base member and the tablet computing device, wherein in a first position the fastener locks the tablet computing device to the base member, and in a second position the fastener releases the tablet computing device from the base member;
   a receptacle to receive a security lock, wherein the security lock is to prevent the fastener from releasing the tablet computing device from the base member by occupying a volume that prevents the fastener from sliding to the second position, and wherein the security lock is coupled to a cable for anchoring the base;
   a shaft connected to the fastener, wherein the shaft occupies at least a portion of the receptacle when the shaft is in the second position, and wherein the security lock is to prevent the shaft from entering the receptacle; and
   a slide stop to engage the security lock to prevent the shaft from entering the receptacle after the security lock is removed from the receptacle.

2. The computing device of claim 1, wherein the receptacle comprises a slot in the base member.

3. The computing device of claim 1, wherein the security lock is to prevent the fastener from releasing the tablet computing device in a first position and to allow the fastener to release the tablet computing device in a second position.

4. A base member usable with a tablet computing device, the base member comprising:
   a keyboard;
   a fastener enclosed within the base member to removably couple a tablet computing device to the base member, wherein in a first position the fastener locks the tablet computing device to the base member, and in a second position the fastener releases the tablet computing device from the base member;
   a receptacle to receive a security lock, wherein the security lock is to prevent the fastener from releasing the tablet computing device in a first mode by occupying a volume that prevents the fastener from sliding to the second position, and to allow the releasing of the tablet computing device in a second mode, and wherein the security lock is coupled to a cable for anchoring the base;
   a shaft connected to the fastener, wherein the shaft occupies at least a portion of the receptacle when the shaft is in the second position, and wherein the security lock is to prevent the shaft from entering the receptacle; and
   a slide stop to engage the security lock to prevent the shaft from entering the receptacle after the security lock is removed from the receptacle.

5. The base member of claim 4, wherein the fastener is to allow the tablet computing device to be connected thereto if the security lock is attached to the receptacle.

6. A base member usable with a tablet computing device, the base member comprising:
- a keyboard;
- a fastener enclosed within the base member to removably couple a tablet computing device to the base member, wherein in a first position the fastener locks the tablet computing device to the base member, and in a second position the fastener releases the tablet computing device from the base member;
- a receptacle to receive a security lock, wherein the security lock is coupled to a cable for anchoring the base;
- a tablet computing device locking mechanism to receive the security lock and to rotate in a first direction to prevent the tablet computing device from being removed from the base member by preventing the fastener from sliding to the second position, and to rotate in a second direction to allow the tablet computing device to be removed from the base member by allowing the fastener to slide to the second position while the security lock is attached to the receptacle; and
- a shaft connected to the fastener, wherein the shaft occupies at least a portion of the receptacle when the shaft is in the second position, and wherein the security lock is to prevent the shaft from entering the receptacle;
- wherein the tablet computing device locking mechanism comprises a slide stop to engage the security lock to prevent the shaft from entering the receptacle after the security lock is removed from the receptacle.

7. The base member of claim 6, wherein the security lock does not rotate in the receptacle when locked.

8. The base member of claim 6, wherein the tablet computing device is to attach to the base member when the security lock is attached and the locking mechanism is rotated in the first direction.

* * * * *